March 29, 1966     A. D. KOMPELIEN     3,243,609
SEMICONDUCTOR APPARATUS
Filed July 24, 1964
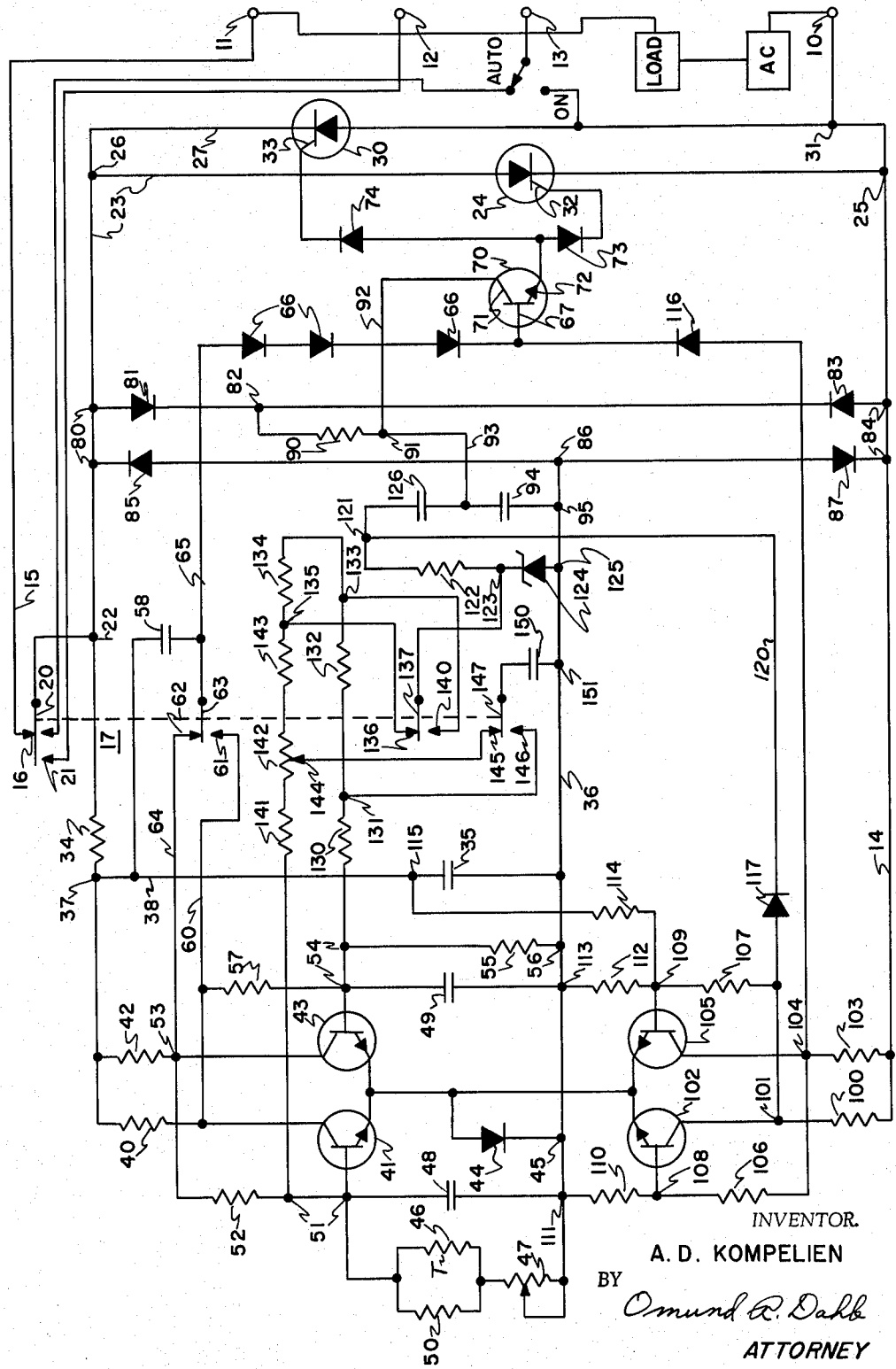
INVENTOR.
A. D. KOMPELIEN
BY Omund R. Dahle
ATTORNEY 
United States Patent Office 3,243,609
Patented Mar. 29, 1966

3,243,609
SEMICONDUCTOR APPARATUS
Arlon D. Kompelien, Richfield, Minn., assignor to Honeywell Inc., Minneapolis, Minn., a corporation of Delaware
Filed July 24, 1964, Ser. No. 384,840
1 Claim. (Cl. 307—88.5)

My invention relates to a solid state thermostat temperature control system and more specifically to an improved two-wire electronic thermostat system incorporating controlled rectifier switching, electronic on-off differential controlling circuit means and electronic cycler circuit means. In my invention the solid state thermostat operates as a switch, on demand, to short together the two wires converted to it to thereby complete a circuit from the A.C. source and through the load device, which load may be, for example, the furnace gas valve. At the same time the solid state thermostat derives its switching power from the same two wires. In one of the normal systems in which it may be utilized it functions from a 60 c.p.s. 18–30 volt R.M.S. supply, controlling resistive or inductive load currents over the range from approximately .1 amp to 1.5 amps. In my invention electrical potentials rather than heat are utilized to provide cycling of the system by means of adjustable RC time constants, and the cycling rate is independent of other circuit conditions. Because there is no auxiliary heat applied to the temperature sensor for cycling, the thermostat is not sensitive to variations in air flow velocity over the sensor. The invention may also include apparatus for utilizing the invention for both heating and cooling.

An object of this invention therefore is to provide an improved temperature control system utilizing a solid state thermostat and which is operative in a two-wire system.

Another object of my invention is to provide an improved two-wire temperature control system of the solid state type in which the two terminals being switched by the solid state switch to control the load, also provides the energizing power for the solid state switch circuit itself.

Another object of my invention is to provide an improved heating-cooling temperature control system utilizing a solid state electronic thermostat system which incorporates a differential controlling circuit and an electronic cycler controlling circuit in which the switchover from heating to cooling is so arranged that the temperature sensing circuitry is not affected by the switchover.

These and other objects of the invention will be more clearly comprehended upon a consideration of the claim, specification and drawing of which the single figure of the drawing is a schematic disclosure of a preferred embodiment of my invention.

Referring now to the drawing, there is disclosed a pair of power input terminals 10 and 11 which are to be connected in circuit with a low voltage A.C. power source and the load being controlled. This load may be the gas valve of a furnace. Also disclosed is another terminal 12 utilized for controlling the cooling load, not shown, and a fourth power terminal 13 for control of a fan. Referring again to the terminals 10 and 11, it can be seen that the common terminal 10 is connected to a common conductor 14, and that the terminal 11 is connected to a conductor 15 which terminates at stationary contact 16 of a three-position switch 17. The switch 17 has a movable blade 20 which may be operated to make contact with the contact 16 in the "heating" position or moved to make contact with another stationary contact 21 in the "cooling" position. The movable blade also has a third center "off" position. Other contacts of switch 17 will be described below. Movable blade 20 is connected by a junction 22, and a conductor 23 to the anode of an SCR 24. The cathode of the SCR 24 is connected to common conductor 14 at a junction 25. Conductor 23 is also connected at a junction 26 and by a conductor 27 to the cathode of a second SCR 30. The anode of SCR 30 is connected to the common conductor 14 at junction 31. SCR 24 has a control or gate electrode 32 and SCR 30 has a control or gate electrode 33. The anode of each SCR is thus connected to the cathode of the other so that the devices are connected in a back-to-back or parallel-inverse circuit arrangement. These SCR's, when caused to conduct, operate to effectively short together the terminals 10 and 11 to thereby energize the load.

The movable blade 20 is also connected by junction 22, a resistor 34, a junction 37, a conductor 38, and a smoothing capacitor 35 to a central conductor 36. Resistor 34 and capacitor 35 form a "rate of rise" filter. The junction 37 between resistor 34 and capacitor 35 is connected through a collector load resistor 40 to the collector electrode of a transistor 41, which transistor 41 also includes an emitter electrode and a base electrode. The junction 37 is also connected through a collector load resistor 42 to a collector electrode of a transistor 43, which transistor also includes an emitter electrode and base electrode. The emitter electrodes of transistors 41 and 43 are connected together and are connected through a diode 44 to the central conductor 36 at a junction 45.

The transistor 41 base electrode is connected through a temperature responsive resistor or thermistor 46 and through a set point potentiometer 47 to the central conductor 36. If desired, a resistor 50 may be placed in parallel with thermistor 46. The transistor 41 base electrode is also connected by a junction 51, a resistor 52 and a junction 53 to the transistor 43 collector. A capacitor 48 is also connected from junction 51 to conductor 36. Transistor 43 base electrode is connected through a junction 54, and a resistor 55 to a junction 56 on the central conductor 36. A capacitor 49 is in parallel with the resistor 55. This base electrode is also connected by the junction 54 and a resistor 57 to the transistor 41 collector.

The transistor 41 collector electrode is connected by a conductor 60 to another stationary contact 61 of the switch 17. This section of the switch also includes a further stationary contact 62, and a movable blade 63, the contact 62 being connected by a conductor 64 to the transistor 43 collector. Blade 63 is connected by a conductor 65 and one or more diodes 66 to the base electrode 67 of a transistor 70. A capacitor 58 is connected between conductor 65 and conductor 38. The transistor 70 also includes a collector 71 and an emitter electrode 72, the emitter 72 being connected by a diode 73 to gate electrode 32 and by a diode 74 to the gate electrode 33. The transistor 70 operates as a current amplifying stage.

A full-wave bridge type rectifier is connected across the conductors 23 and 14. This bridge rectifier circuit may be traced from a junction 80 on conductor 23 through a first rectifying diode 81, a junction 82, and then through a second rectifying diode 83 to a junction 84 on the conductor 14. In the circuit path just traced the diode 81 is in the forward direction and the diode 83 is the reverse direction. The circuit path of the other two legs of the bridge rectifier may be traced from the junction 80 on the conductor 23 through a third rectifying diode 85, which is connected in the reverse direction, a junction 86, and through a fourth rectifying diode 87, which is connected in the forward direction, to the junction 84. The junction 86 is connected to the central conductor 36 and the junction 82 is connected through a current limiting resistor 90, a junction 91, and a conductor 92 to the collector electrode 71 of the amplifying transistor 70. The junction 91 is further connected by means of a conductor 93 and a smoothing or filter capacitor 94 to a junction 95 on the central conductor 36.

The transistors 41 and 43 and the associated components, above described, comprise the basic switching circuit which determines whether the SCR 24 is to be conductive.

A slaved switching circuit quite similar to that described in connection with transistors 41 and 43 is connected to control the firing of SCR 30. This slaved switching circuit will now be described in more detail. A circuit may be traced from the common terminal 14 through a collector load resistor 100 and a junction 101 to the collector electrode of a transistor 102. Transistor 102 also includes a base electrode and an emitter electrode. Another circuit may be traced from the conductor 14 through a collector load resistor 103, and a junction 104 to the collector electrode of a transistor 105. The transistor 105 also includes a base electrode and an emitter electrode, the emitter electrodes of the two transistors being directly connected together and being further connected through the rectifying diode 44 to the central conductor 36 at junction 45.

Each of the base electrodes of transistors 102 and 105 is cross-coupled to the collector electrode of the opposite transistor, the base of transistor 102 being connected through a junction 108 and a resistor 106 to the junction 104, and the base electrode of transistor 105 being connected through a junction 109 and a resistor 107 to the junction 101. Junction 108 is further connected through a biasing resistor 110 to a junction 111 on the central conductor 36. Likewise, the junction 109 is connected through a resistor 112 to a junction 113 on the conductor 36. The junction 109 is also connected through a resistor 114 to a junction 115 between the capacitor 35 and the junction 37.

The output signal from the slaved switching circuit may be traced from the junction 104 through a diode 116 to the base electrode 67 of transistor 70. Another output from the slaved switch may be traced from junction 101 through a rectifying diode 117, a conductor 120, a junction 121, a resistor 122, a junction 123 and a zener diode 124 to a junction 125 on the conductor 36. The junction 121 is connected through a capacitor 126 to the conductor 93 and the capacitor 94.

The switching circuit comprising transistors 41 and 43 also includes a differential creating circuit and a cycler circuit. The differential circuit may be traced from the base electrode of transistor 43 through the junction 54, a relatively large resistor 130, a junction 131, a second relatively large resistor 132, a junction 133, a third resistor 134, a junction 135, to a stationary contact 136 of the switch 17. Also associated with stationary contact 136 is a movable blade 137 and a further stationary contact 140. The movable blade 137 is connected to the junction 123 so that when a reference voltage is established across the zener diode 124 this voltage is applied through the switch contacts 137 and 136 to the differential network.

The cycler circuit may be traced from the base electrode of transistor 41 through the junction 51, a resistor 141, a potentiometer 142, and a resistor 143 to the junction 135. The potentiometer 142 also includes an adjustable wiper contact 144 which is directly connected to the stationary contact 145 of switch 17. This set of contacts also includes another stationary contact 146 and a movable blade 147. The blade 147 is connected through a relatively large capacitor 150 to the central conductor 36 at a junction 151.

Operation

Initial consideration of the operation of the circuit of this solid state thermostat will be in connection with utilizing the system in the heating function. Manually controlled switch 17, which switch is shown in the heating position, is also operable to a center position in which the movable blades 20, 63, 137 and 147 do not make contact with the stationary contacts. The switch is also operable to a third position to control air conditioning or cooling. The switch 17 is shown in the heating position and in this position the movable blades 20, 63, 137 and 147 make contact, respectively, with stationary contacts 16, 62, 136 and 145.

Let us initially consider the condition of operation in which the area being heated is satisfied and therefore there is no call for heat from the system and the SCR's must be maintained "off." The thermistor 46 has a negative temperature co-efficient and therefore in the satisfied condition the resistance of the thermistor is at a reduced value. Under these conditions, the transistor 41 is maintained cut off and the transistor 43 is "on" or conductive. Transistors 41 and 43 may be considered as a type of flip-flop switch. A current path may then be traced from the power input terminal 11 through the conductor 15, the contacts 16 and 20, the junction 22, the resistor 34 and capacitor 35 whereupon the capacitor 35 commences to charge. It will be noted that the resistors 42, 52, 46, 50 and 47 form two arms of a resistive bridge network and that resistors 40, 57 and 55 form third and fourth arms of a bridge network to control the transistor switch comprising transistors 41 and 43. As capacitor 35 charges current flows through the voltage divider biasing resistors 40, 42, 52, 57, 55, 46, 50 and 47 and the switching decision turns on transistor 43. This switching decision is made early in the half cycle for example, when the voltage on capacitor 35 is in the order of 2 volts. Then current flows through resistor 42 and transistor 43 from collector to emitter, through the diode 44, central conductor 36, rectifying diode 87, and common conductor 14 to terminal 10. Due to the voltage drop across resistor 42 the potential at junction 53 is relatively low so that there is insufficient voltage to cause current to flow through the forwardly biased diodes 66 and transistor 70 to fire the SCR 24. As a result the SCR does not fire and the potential existing between conductors 23 and 14 is relatively large generally following the supply voltage waveform. In this type of temperature control system, the A.C. source voltage is often in the order of 18–30 volts R.M.S. and thus the relatively large voltage referred to immediately above may approach 25 volts or larger.

Considering again the switching decision, as the voltage rises from zero to approximately 2 volts so that transistor current just begins to flow, the current gains of the transistor are low so that the positive feedback between the transistors 41 and 43 is not sufficient to make the circuit bistable and at that point the circuit is acting as a differential amplifier. As the applied voltage continues to rise, the transistor currents increase and the circuit quickly becomes bistable with the transistor having the higher base current at the time taking the "on" state.

The capacitor 35 continues to be charged and the charging current path may be traced from terminal 11 through conductor 15, contacts 16 and 20, resistor 34, capacitor 35, conductor 36, diode 87 and conductor 14 to terminal 10. In addition a charging current path for capacitor 94 may be traced from junction 22, conductor 23, junction 80, diode 81, resistor 90, conductor 93, capacitor 94, diode 87 and conductor 14 to the terminal 10. The above described operation has been concerned with a first half cycle of the supply voltage which is applied between terminals 10 and 11, this half cycle being one in which terminal 11 is positive with respect to terminal 10.

Considering the second half cycle of supply potential in which terminal 11 becomes negative with respect to terminal 10, it may be seen that current will flow through the biasing resistors 100, 103, 106, 107, 110 and 112 of the slaved switching amplifier comprising transistors 102 and 105. Resistor 110 is preferably designed to be larger than resistor 112 so that in the absence of a substantial potential on capacitor 35, the transistor 102 will be biased conductive and the transistor 105 will be "off." In the first half cycle, however, the SCR 24 was not fired and therefore a substantial charge has been developed on capacitor 35. This potential is applied through junction 115 and resistor 114 to the base electrode of transistor 105 to overcome the quiescent bias, thereby turning "on" transistor 105 and turning off transistor 102. With transistor 105 being rendered conductive a current path may be traced from the terminal 10 through the conductor 14, the resistor 103, through the transistor from collector to emitter, through diode 44, conductor 36, junction 86, diode 85, junctions 80 and 22, contacts 16 and 20, and conductor 15 to the terminal 11. Under these conditions the potential appearing at junction 104 is insufficient to cause a current to flow through the diode 116, and therefore transistor 70 is not turned on and SCR 30 is not rendered conductive. The relatively high voltage appearing at junction 101 causes a current to flow through the rectifier 117, a conductor 120, the junction 121 and then to charge the capacitor 126 such that the upper terminal of capacitor 126 is positive with respect to conductor 36.

The sum of the potentials on capacitors 94 and 126 is sufficient to cause a current to flow through resistor 122 and zener diode 124 thereby establishing a reference potential at junction 123. The reference potential at junction 123 appears through contacts 137 and 136, and is applied through resistors 134, 132 and 130 to the base electrode of transistor 43. This purely resistive network is a differential creating circuit which is in a positive feedback direction to cause bistable action. In other words the differential is applied in a sense to maintain the switch in its condition. Due to this effect the value of the thermistor resistance must change by a predetermined amount before the switching decision will be reversed, neglecting a signal from the cycler circuit.

With the reference potential appearing at junction 123 a current also flows in the circuit from the junction 123 through the contacts 136 and 137, through resistor 143 and potentiometer 142, wiper 144, contacts 145 and 147 and then to capacitor 150 to begin charging capacitor 150. The values of resistors 143 and potentiometer 142 are relatively large such that the time constant of these resistors and the relatively large capacitor 150 provides a long time constant. As cycler capacitor 150 continues to charge, a cycler current begins to flow from the wiper 144 through the remainder of the potentiometer 142 and resistor 141 to the base electrode of transistor 41. This slowly applied cycler signal is in opposition to the differential signal applied to the transistors. It may therefore be seen that there are three currents operating upon the switching circuit comprising transistors 41 and 43, these being the current from the temperature sensitive bridge, the current from the differential creating circuit and the slowly varying current from the cycler circuit. Operation on succeeding cycles continues as described.

The current which flows through the load to energize the electronic thermostat circuit, is negligible when there is no call for heat and the SCR's are nonconductive. This minimum current has no effect on the load device as it is negligible compared to the required load current which flows when the SCR's are "on."

Let us now assume that the temperature in the space being controlled begins to decrease. In this case the resistance value of the thermistor 46 will increase. In addition, the current from the cycler circuit is continuing to increase at a rate determined by the time constants of the cycler network. At some point of time the summation of the bias currents applied to the switching circuit will be changed sufficiently so that the switching circuit comprising transistors 41 and 43 reverses the switching decision and transistor 41 is rendered conductive and transistor 43 is biased to cutoff. Under these conditions, when terminal 11 is instantaneously positive with respect to terminal 10, a current path may be traced from conductor 15, contacts 16 and 20, resistors 34 and 40, from collector to emitter of transistor 41, through diode 44, conductor 36, diode 87 and conductor 14 to terminal 10. There is no current flowing through the transistor 43 so that the potential at junction 53 is relatively high, as compared with the potential at conductor 60. This potential rapidly becomes sufficiently large to provide a turn-on signal through the conductors 64 and 65, the diodes 66 to the base electrode 67 of transistor 70. This turn-on current renders transistor 70 conductive and a further current path through the transistor output circuit may be traced from conductor 23 through diode 71, resistor 90, conductor 92, from collector to emitter of transistor 70, through diode 73, to the gate electrode 32 of SCR 24, to render the SCR conductive.

With SCR 24 conductive, a load current circuit may be traced from terminal 11 through conductors 15 and 23, through SCR 24 from anode to cathode and through conductor 14 back to terminal 10. The switching decision of transistors 41 and 43 is always made very early in the half cycle of the A.C. power supply so that the SCR 24 may be turned on shortly thereafter as the supply potential wave form continues to rise from zero. Thus the SCR is conductive for substantially all of the half cycle period to supply substantially full energization of the load.

During this "on" state of the system and assuming an inductive load is being controlled, it will be recognized that the supply voltage leads the circuit current. After the negative half cycle of current flow drops near zero and the SCR's momentarily go off, the voltage applied to the circuit tends to rise very rapidly in the positive direction due to the leading voltage caused by the inductive load. This rapidly rising voltage is modified by the RC "rate of rise" filter 34 and 35 which limits the rate of rise to the temperature sensing circuit thereby minimizing the undesirable effect of transient voltages on the decision circuit comprising transistors 41 and 43. Charging of capacitor 35 ceases, of course, when SCR 24 fires.

Once the SCR is turned on no further energization of the switching circuit is necessary for the remainder of that half cycle. With SCR 24 being conductive, the majority of the supply voltage is dropped across the load and only a very small potential, in the order of a volt, remains across the SCR's and thus between conductors 23 and 14. This insignificant potential is not effective to charge capacitor 35 and therefore is no bias supplied through resistor 114 to the slaved amplifier comprising transistors 102 and 105. As has been described above, when there is no current flowing through resistor 114, the resistive network controlling transistors 102 and 105 is designed so that transistor 102 will be turned "on" and transistor 105 will be off. Thus, when the second half cycle of the supply voltage occurs, that is, when terminal 10 is instantaneously positive with respect to terminal 11, the transistor 102 will be conductive.

A current path for this condition may be traced from terminal 10 through the conductor 14, resistor 100, from collector to emitter to transistor 102, through diode 44, conductor 36, diode 85, and through conductors 23 and 15 to the terminal 11. Under these conditions the potential at junction 101 is very low and there will be no charging current flowing through diode 117 to capacitor 126. The potential at junction 104 will become sufficiently high to cause a turn-on current to flow through diode 116, base-to-emitter of transistor 70, and diode 74 to the gate electrode 33 of SCR 30.

Thus, it may be seen that when the switching decision has been made to render SCR 24 conductive, the slaved circuit is effective on the succeeding half cycle to render SCR 30 conductive to thereby provide full-wave energization to the load. With SCR 30 being rendered conductive, it can again be seen that the potential between conductors 14 and 23 is very low so that current no longer flows through diodes 83 and 85 to charge the capacitor 94. In addition as has been mentioned above, no current flows through the diode 117 to charge the capacitor 126. As a result there is substantially no voltage appearing at junction 123 and thus the differential circuit has no potential appearing upon it. The differential circuit has thus been deenergized. Likewise, there is no potential to continue the charging of cycler capacitor 150 and the capacitor voltage begins a gradual and slow decay, so that the cycler signal to transistor 41 gradually decays.

The time constant of the cycler circuit may be in the order of minutes. For example, it may be desirable to have the apparatus cycle at least four times an hour.

We have now followed the operation of the system through one cycle of the power supply when there is a call for heat. When the second cycle begins, that is, when terminal 11 again becomes positive with respect to terminal 10, the differential current will have been largely eliminated, and therefore the signal from the temperature bridge will be substantially more effective to render transistor 41 conductive at the beginning of the second cycle.

As the cycler current continues to decay and as the temperature of the space being controlled begins to rise, a point will again be reached where the system is satisfied and transistor 43 is again turned on.

When it is desired to control air conditioning or cooling with this apparatus, the heat-off-cool switch 17 is operated to the cool position so that movable blades 20, 63, 137 and 147 make contact, respectively, with contacts 21, 61, 140 and 146. Under these conditions, the diodes 66 and transistor 70 are connected to the collector of transistor 41 instead of to the collector of transistor 43 to obtain the opposite effect of the switching of transistors 41 and 43. In other words, the sense of the signal at the collector of transistor 43 is the opposite or reverse of that at the collector of transistor 41. Considering now the blade 147 and the contact 146, it may be seen that the capacitor 150 is disconnected from wiper 144 and potentiometer 152 and is connected to junction 131 between resistors 130 and 132. The contact 145 now becomes an open circuit. Also referring to contacts 136, 140 and blade 137 it may be seen that in the cooling position, the regulated voltage from junction 123 is connected to junction 133 rather than junction 135. The effect of this switching is that resistors 132 and 130 and the capacitor 150 now become the cycler circuit. Also, the resistors 134, 143, 142 and 141 now become the differential creating circuit. Thus it may be seen that the functions of these two networks have been reversed in the switchover from heating to cooling. The operation of the circuits is substantially the same for cooling as has been described above for heating except that the cooling load at terminal 12 is energized when transistor 43 is "on" whereas the heating load is energized when transistor 41 is on. Since capacitor 35 is only charged when SCR 24 is not conducting, the slaved amplifier continues to operate as before.

The fan switch at terminal 13 is not related to the invention above described. In the "on" position the fan load is converted so that it is on continuously. In the "automatic" position it is connected in parallel with the cooling load as long as the system switch 17 is in the "cool" position. With the system switch in the heat position the fan is normally controlled by other means, not shown, such as a plenum fan control.

Modifications of this invention may occur to those skilled in the art and I therefore wish to be limited solely by the scope of the appended claim and not by the specific embodiment which is disclosed here for the purpose of illustration only.

I claim:

Electronic temperature control apparatus comprising:
controlled rectifier means for energizing load means from an alternating current source, said controlled rectifier means comprising first and second parallel-inverse connected semiconductor devices each including a pair of current carrying electrodes and a control electrode;
first transistor flip-flop means having a plurality of electrodes including output electrodes and a control electrode;
rectifying means energizing said first flip-flop means during one half cycle of said alternating source;
second slaved transistor flip-flop means having a plurality of electrodes including output electrodes and a control electrode;
rectifying means energizing said slaved flip-flop means during the other half cycle of said alternating source;
slaving connection means connected between said first flip-flop means and said second flip-flop means such that said second flip-flop means is operated to the same condition as said first flip-flop means;
means connecting the output electrodes of said first and second transistor flip-flop means to the control electrodes of said first and second controlled rectifier means;
temperature responsive impedance means;
first signal means connecting said temperature responsive impedance means to said first transistor flip-flop means control electrode in controlling relation thereto;
differential signal means energized by the potential across said controlled rectifier means and having an output connected to said first transistor means control electrode, said differential signal means being de-energized upon said semiconductor switching means becoming conductive;
and signal producing means for providing cycler action connected to said first transistor means, said cycling signal producing means having a relatively long time constant and being energized in like manner with said second signal producing means but having an output which slowly increases and decreases in magnitude as a function of time, said third cycler signal producing means being connected such that it has an opposing control signal effect on said first transistor flip-flop means as compared with the signal from said differential signal producing means.

References Cited by the Examiner

UNITED STATES PATENTS

| | | | |
|---|---|---|---|
| 3,075,163 | 1/1963 | Jones | 307—88.5 |
| 3,097,314 | 6/1963 | Harriman | 219—501 |
| 3,111,008 | 11/1963 | Nelson | 328—3 |
| 3,149,224 | 9/1964 | Horne et al. | 307—88.5 |
| 3,159,737 | 12/1964 | Dora | 328—3 |
| 3,161,759 | 12/1964 | Gambill et al. | 307—88.5 |

ROBERT A. O'LEARY, *Primary Examiner.*

M. A. ANTONAKAS, *Assistant Examiner.*